(12) United States Patent
Huff et al.

(10) Patent No.: US 12,137,804 B2
(45) Date of Patent: Nov. 12, 2024

(54) PLATFORM LEVELING APPARATUS

(71) Applicants: Ryan Huff, Bozeman, MT (US); Brian Fulton, Huntington Beach, CA (US)

(72) Inventors: Ryan Huff, Bozeman, MT (US); Brian Fulton, Huntington Beach, CA (US)

( * ) Notice: Subject to any disclaimer, the term of this patent is extended or adjusted under 35 U.S.C. 154(b) by 462 days.

(21) Appl. No.: 17/604,656

(22) PCT Filed: May 5, 2020

(86) PCT No.: PCT/US2020/031498
§ 371 (c)(1),
(2) Date: Oct. 18, 2021

(87) PCT Pub. No.: WO2020/231677
PCT Pub. Date: Nov. 19, 2020

(65) Prior Publication Data
US 2022/0110449 A1    Apr. 14, 2022

Related U.S. Application Data

(60) Provisional application No. 62/847,157, filed on May 13, 2019.

(51) Int. Cl.
| | | |
|---|---|---|
| *A47B 91/16* | (2006.01) | |
| *A47C 17/80* | (2006.01) | |
| *B60P 3/39* | (2006.01) | |
| *A47C 17/86* | (2006.01) | |

(52) U.S. Cl.
CPC ............. *A47B 91/16* (2013.01); *A47C 17/80* (2013.01); *B60P 3/39* (2013.01); *A47C 17/86* (2013.01)

(58) Field of Classification Search
CPC . A47B 91/16; A47B 2200/0043; A47B 19/06; A47B 13/02; A47B 13/081; A47B 1/00; A47C 17/80; A47C 17/86; A47C 17/82; B60P 3/39; B60P 3/38; B60P 3/32; B62D 33/0612; F16M 11/14; F16M 11/125
USPC .......... 108/8, 6, 10; 248/133, 134, 136, 137, 248/138, 139, 140, 141, 142
See application file for complete search history.

(56) References Cited

U.S. PATENT DOCUMENTS

| | | |
|---|---|---|
| 3,472,183 A | 10/1969 | Goodman |
| 3,760,436 A | 9/1973 | Zach et al. |

(Continued)

OTHER PUBLICATIONS

Michelle Clifford, Measuring Tilt with Low-g Accelerometers, May 2005, NXP, 1-8. (Year: 2005).*

*Primary Examiner* — Justin C Mikowski
(74) *Attorney, Agent, or Firm* — Antoinette M. Tease

(57) ABSTRACT

A platform leveling apparatus with a platform attached to a frame, two and only two linear actuators, and one and only one heim joint. The upper ends of the linear actuators are rotatably attached to the front frame member, and the heim joint is connected to the rear frame member. The lower end of the heim joint is connected to an upper end of a heim joint support, and the lower end of the heim joint support is connected to a rear base support by front and/or rear heim joint braces. The rear base support is oriented parallel to the rear frame member when the heim joint is at a centered position, and the rear base support is positioned below a front edge of the rear frame member. The lower ends of the linear actuators are rotatably connected to a first fixed surface.

14 Claims, 6 Drawing Sheets

(56) References Cited

U.S. PATENT DOCUMENTS

| | | | | |
|---|---|---|---|---|
| 4,064,814 | A | * | 12/1977 | Pokorny .............. A47B 87/002 |
| | | | | 108/77 |
| 4,715,073 | A | | 12/1987 | Butler |
| 5,105,486 | A | | 4/1992 | Peterson |
| 5,310,100 | A | * | 5/1994 | Liscinsky ............... B60R 9/065 |
| | | | | 224/527 |
| 5,369,889 | A | * | 12/1994 | Callaghan .............. G01C 19/38 |
| | | | | 33/324 |
| 5,820,478 | A | * | 10/1998 | Wood ................ A63B 69/3652 |
| | | | | 473/279 |
| 6,065,792 | A | * | 5/2000 | Sciullo .................... B60P 1/003 |
| | | | | 414/522 |
| 6,739,269 | B1 | * | 5/2004 | Benton .................. B60N 3/001 |
| | | | | 108/44 |
| 7,146,662 | B1 | | 12/2006 | Pollard et al. |
| 8,037,559 | B2 | | 10/2011 | Niwa |
| 8,468,826 | B2 | | 6/2013 | Carrier |
| 10,857,418 | B2 | * | 12/2020 | Lagree ............... A63B 21/4047 |
| 2003/0094123 | A1 | * | 5/2003 | Ulmer .................. A47B 13/023 |
| | | | | 108/10 |
| 2007/0228234 | A1 | * | 10/2007 | Doyle ...................... A47B 9/10 |
| | | | | 248/188.5 |
| 2010/0223724 | A1 | | 9/2010 | Niwa et al. |
| 2013/0097782 | A1 | | 4/2013 | Carrier |
| 2015/0320213 | A1 | * | 11/2015 | Sorrell .................... A47B 9/04 |
| | | | | 108/147.19 |
| 2018/0055234 | A1 | | 3/2018 | Strater |

* cited by examiner

Figure 8
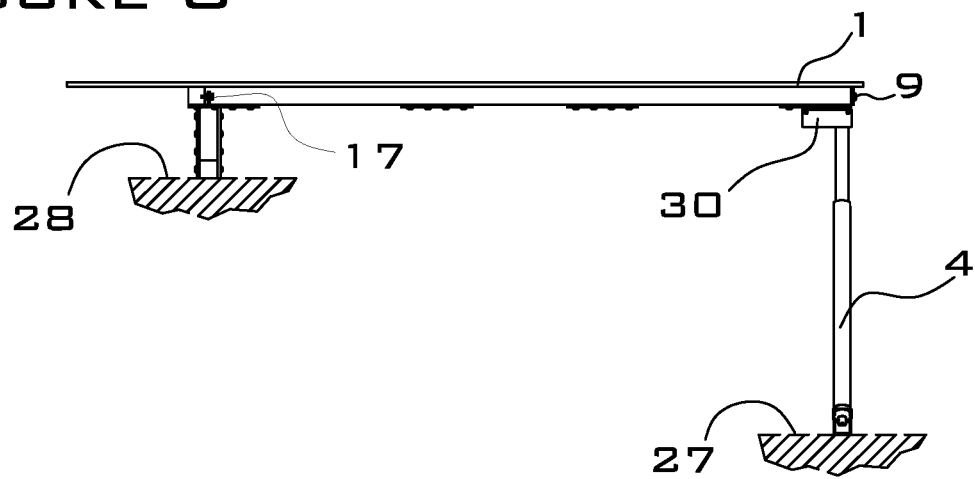
Figure 9
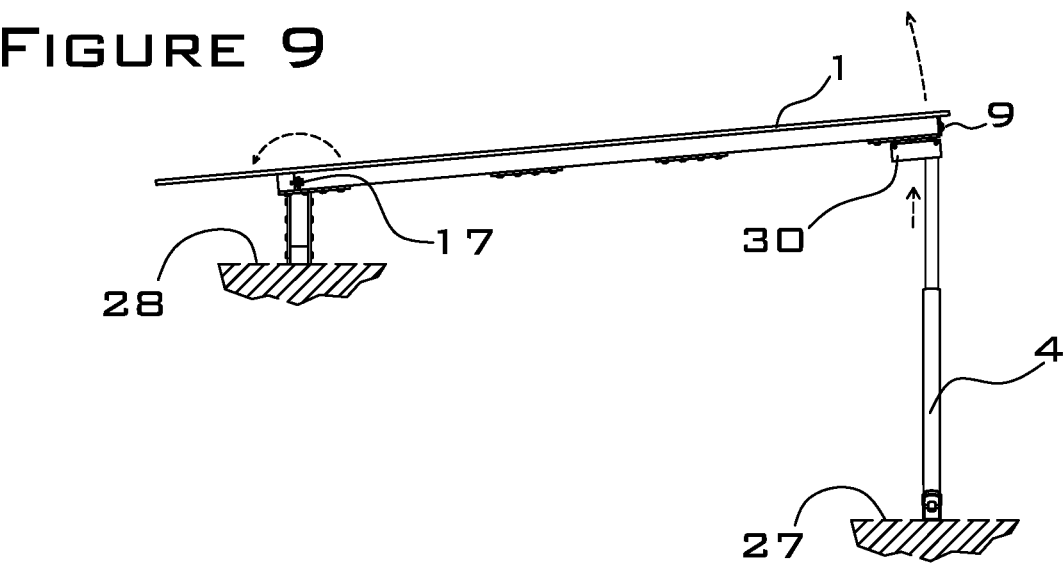
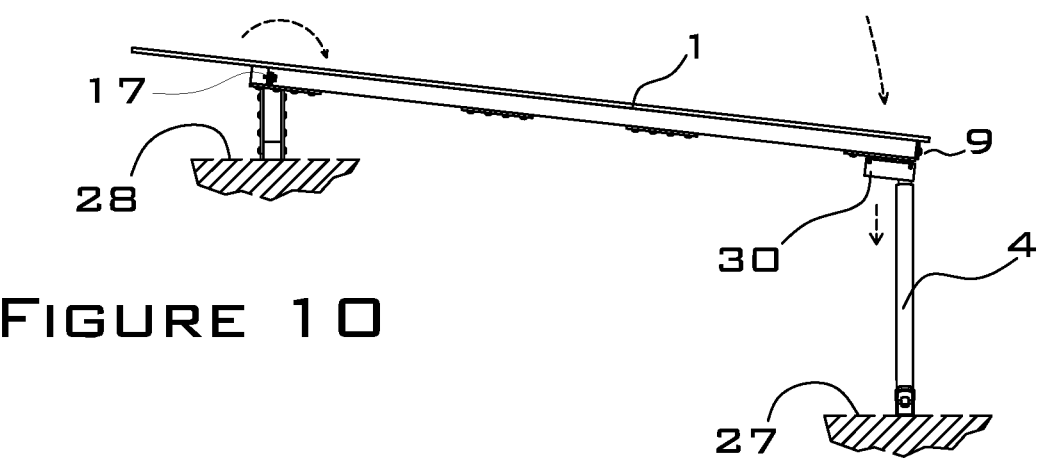
Figure 10

PLATFORM LEVELING APPARATUS

CROSS-REFERENCE TO RELATED APPLICATION

This application claims priority back to U.S. Patent Application No. 62/847,157 filed on May 13, 2019, the contents of which are incorporated herein by reference.

BACKGROUND OF THE INVENTION

1. Field of the Invention

The present invention relates to the field of vehicle-mounted sleeping beds, and more particularly, to beds that are adjustable so as to provide a horizontal sleeping platform when the vehicle is parked on a sloped ground surface.

2. Description of the Related Art

The present invention provides a sleeping platform that is capable of front-to-rear tilt as well as side-to-side tilt. The sleeping platform has a three-point support-and-adjustment system that is comprised of two piston-driven linear actuators and a single spherically-rotatable heim joint. The linear actuators are electrically powered from the vehicle's battery. The present invention is primarily designed to fit within the interior of camper-van vehicles but may be used in other vehicles such as semi-trailer trucks. Although there are numerous examples of vehicle-mounted adjustable bed inventions described in the prior art, none of these devices embodies the novel structure of the present invention.

U.S. Pat. No. 3,472,183 (Goodman, 1969) discloses a vertically adjustable table that is raised and lowered via pivotally interconnected cross-bars at opposite ends of the table. This invention does not provide for tilting of the table.

U.S. Pat. No. 3,760,436 (Zach et al., 1973) discloses a suspension system for vehicle-mounted beds that isolates the bed from vertical as well as fore-and-aft movement of the vehicle. Vertical isolation is achieved by an air-spring biased scissor-type linkage. Fore-and-aft isolation is achieved by pivoted links attached between the mattress frame and the main suspension frame. This invention does not provide for adjusting the tilt of the bed.

U.S. Pat. No. 4,715,073 (Butler, 1987) discloses a tiltable bed frame that provides adjustment of the mattress about one axis, thereby allowing the head end of the mattress to be raised or lowered with respect to the foot end of the mattress. The invention does not provide for lateral (i.e., left side to right side) tilt adjustment. The tilt mechanism comprises a single actuation assembly such as a linear actuator that is connected between the main frame and an inclined ramp assembly.

U.S. Pat. No. 5,105,486 (Peterson, 1992) discloses an adjustable care bed in which the mattress frame comprises a head section, a seat section and a foot section, each of which can be vertically tilted with respect to each other, and in which the mattress frame can be raised or lowered with respect to the base frame. The bed may be adjusted by a person lying in the bed by shifting his body weight, and the position of the bed may be fixed with a locking mechanism. The elevation of the bed with respect to the base frame may be adjusted by a hydraulic or mechanical jack that is operated by a foot pedal. The invention does not provide for side-to-side tilt adjustment.

U.S. Pat. No. 7,146,662 (Pollard et al., 2006) discloses a self-leveling bed support frame for use in the sleeper cab of a semi-trailer rig. The upper frame is adjustable for tilt along two axes (head-to-toe and side-to-side). The leveling system of the invention comprises a pneumatic actuator positioned between the lower and upper frame at each of the four corners of the invention and level control sensors that independently turn the pneumatic actuators on and off until the plane of the upper frame is oriented parallel to the horizontal plane of the earth. Mercury switches are utilized as level control sensors. The seat back portion of the upper frame may also be tilted upward with respect to the foot portion by a pair of scissor jack mechanisms that are powered by a pneumatically controlled actuator. This invention requires a total of four linear actuators to provide tilting of the bed platform about two axes, whereas the present invention requires only two linear actuators to obtain the same two-axis tilt capability.

U.S. Pat. No. 8,037,559 (Niwa et al., 2011) discloses a variable-posture bed in which the rectangular bed board is supported at the four corners and at the center. Each of the four corners may be raised and lowered vertically in sequence, thereby assisting a person to roll over in the bed without assistance of a caregiver. The bed movements are powered by an electric motor that is connected to a large diameter bevel gear, which in turn is connected to a pair of lever arms that convert rotary motion of the bevel gear to linear up-and-down motion of the corners of the bed platform.

U.S. Pat. No. 8,468,626 (Carrier, 2013) discloses a self-leveling sleeper that levels a bed in a semi-truck cab. The leveling system comprises pivots that allow the bed frame to rotate about two perpendicular axes (front-to-rear and side-to-side). The leveling system may operate either manually or automatically. The leveling system comprises four linear actuators and four pivot supports, in contrast to the present invention which comprises two linear actuators and a single pivot support.

U.S. Patent Application Pub. No. 2018/0055234 (Strater, 2018) discloses a bed leveling system for a vehicle sleeper. The system comprises four hydraulic pistons (one at each corner of the bed frame) and a hydraulic motor to power the hydraulic pistons. A first level-indicator device indicates the bed orientation with respect to an X-axis, and a second level-indicator device indicates the bed orientation with respect to a Y-axis. A user levels the bed by operating the four hydraulic pistons independently until the two level-indicator devices show that the bed is level with respect to both the X-axis and Y-axis.

BRIEF SUMMARY OF THE INVENTION

The present invention is a platform leveling apparatus comprising: a platform attached to a frame, the frame comprising a front frame member and a rear frame member; two and only two linear actuators, the two and only two linear actuators comprising: a first linear actuator having an upper end that is rotatably attached to a first side of the front frame member; and a second linear actuator having an upper end that is rotatably attached to a second and opposite side of the front frame member; and one and only one heim joint configured to form a pivot support; wherein the rear frame member is connected to the one and only one heim joint; wherein the heim joint comprises a lower end that is connected to an upper end of a heim joint support; wherein a lower end of the heim joint support is connected to a rear base support by at least one of a front heim joint brace or a rear heim joint brace; wherein the rear base support is oriented parallel to the rear frame member when the helm joint is at a centered position; wherein the rear base support is positioned below a front edge of the rear frame member; wherein each of the first and second linear actuators has a lower end that is rotatably connected to a first fixed surface; wherein each of the first and second linear actuators comprises a piston that is configured to be extended and retracted by an electric motor; and wherein the platform is configured to tilt both side-to-side and front-to-rear on the one and only one heim joint.

In a preferred embodiment, the frame further comprises a left frame member, a right frame member, and at least one internal frame member; wherein the front frame member, the rear frame member, the left frame member and the right frame member are configured to form a perimeter of a rectangle; and wherein the at least one internal frame member extends from one side of the perimeter of the rectangle to an opposing side of the rectangle. Preferably, the rear base support comprises a first end and a second end, each of which is configured to be attached to a second fixed surface.

The invention preferably further comprises: a first level indicator that is mounted to a front face of the front frame member and configured to measure side-to-side tilt of the platform; and a second level indicator that is mounted to the frame and configured to measure front-to-rear tilt of the platform. In a preferred embodiment, the second level indicator is mounted to a bottom front edge of the left frame member or the right frame member. Preferably, the frame is situated entirely underneath the platform.

In a preferred embodiment, the platform is flat and rectangular in shape. In an alternate embodiment, the platform comprises cutouts that are configured to enable the platform to fit within an interior of the vehicle. In another alternate embodiment, the invention further comprises: a table support panel that is fixedly attached to an underside of the platform so that the table support panel is parallel to the underside of the platform; and at least one table board that is slidably mounted between the table support panel and the underside of the platform.

In a preferred embodiment, the invention further comprising a stabilizer arm having an upper end that is rotatably attached to an angle bracket, the angle bracket being attached to an underside of the table support panel, and a lower end that is configured to be rotatably attached to a sturdy vertical surface within the vehicle. Preferably, the platform is situated on or in a vehicle that is parked on a ground; and the first fixed surface is parallel to the ground. In an alternate embodiment, the invention further comprises: a first electronic accelerometer that is situated on an X-axis of the bed platform; and a second electronic accelerometer that is situated on a Y-axis of the platform.

In a preferred embodiment, the one and only one heim joint is connected to a center portion of the rear frame member. In alternate embodiments, the helm joint is replaced with a ball joint, and the first and second linear actuators are replaced with manual screw jacks.

BRIEF DESCRIPTION OF THE DRAWINGS

FIG. 8 is a left side elevation view of the present invention with the bed platform in a horizontal position.

FIG. 9 is a left side elevation view of the present invention with the bed platform tilted so that the head end is higher than the foot end.

FIG. 10 is a left side elevation view of the present invention with the bed platform tilted so that the head end is lower than the foot end.

REFERENCE NUMBERS

Figure 1:
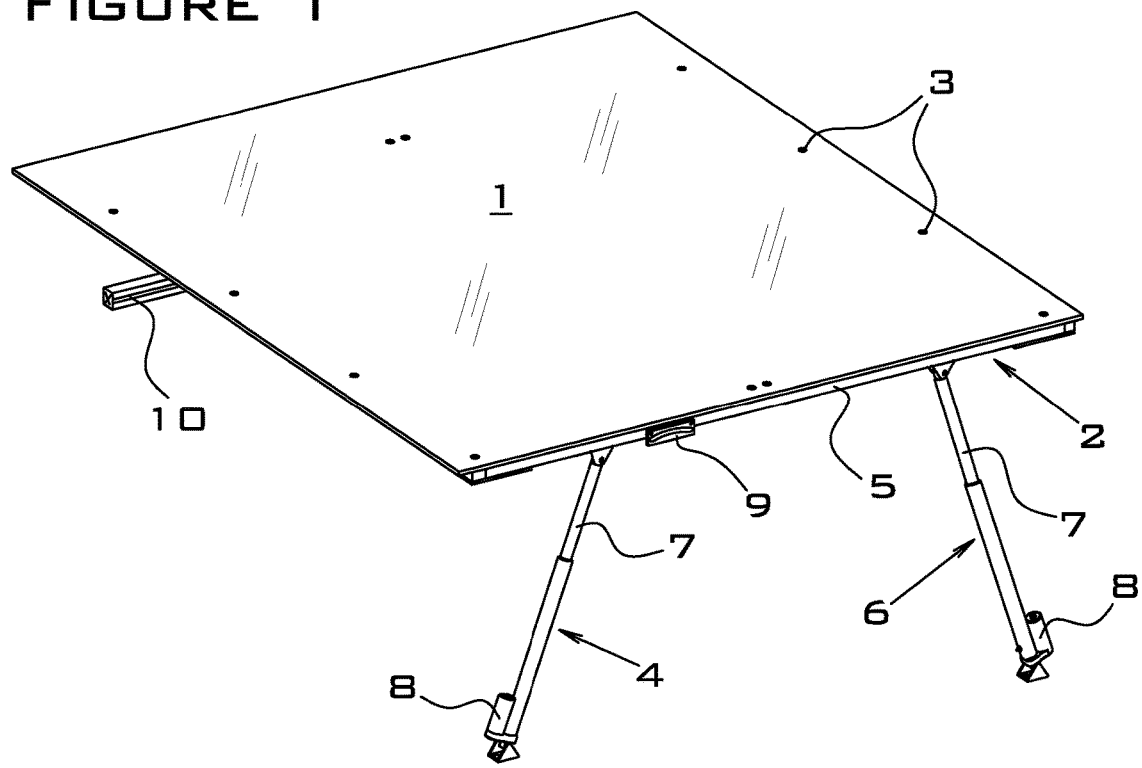
FIG. 1 is a perspective view of the present invention showing the top, left side and front side.

1 Bed platform
2 Bed platform frame
3 Machine screw
4 First linear actuator
5 Front frame member
6 Second linear actuator
7 Piston of a linear actuator
8 Motor of a linear actuator
9 First level indicator
10 Rear base support
11 Rear frame member
12 Left frame member
13 Right frame member
14 First internal frame member
15 Second internal frame member
16 Corner braces
17 Heim joint
18 Heim joint support
19 Front heim joint brace
20 Rear heim joint brace
21 Bolt of the heim joint
22 Ball swivel of the heim joint
23 Tee nut
24 Slot in the rear frame member
25 Shank of the heim joint
26 Lower pin connection of a linear actuator
27 First fixed surface
28 Second fixed surface
29 Upper pin connection of a linear actuator
30 Second level indicator
31 Cutouts in the bed platform
32 Table board 33 Table support panel
34 Rectangular channels
35 Stabilizer arm
36 First pin connection of the stabilizer arm
27 Angle bracket
38 Second pin connection of the stabilizer arm
39 Vertical surface
40 Momentary contact switch for the linear actuator

DETAILED DESCRIPTION OF INVENTION

FIG. 1 is a perspective view of the present invention showing the top, left side and front side. A rectangular bed platform 1 is attached to a bed platform frame 2 with machine screws 3. In an alternate embodiment, the bed platform 1 and bed platform frame 2 are a single physical item (manufactured as one piece) rather than two separate parts that are attached together. The appended claims are intended to cover both embodiments—the bed platform and bed platform frame being two separate parts and the bed platform and bed platform frame being a single physical component. All that is required is that the invention have both a bed platform and a bed platform frame.

As shown in FIG. 1, the upper end of a first linear actuator 4 (a/k/a "piston-driven device") is rotatably attached via a pin connection (shown in FIG. 5) to the bottom edge of the left side of a front frame member 5, and the upper end of a second linear actuator 6 is rotatably attached via a pin connection (also shown in FIG. 5) to the bottom edge of the right side of the front frame member 5. The first and second linear actuators 4, 6 each comprises a piston 7 that can be extended or retracted by an electric motor 8. The electric motors 8 are turned on and off with momentary-contact switches 40 (shown in FIG. 14) that are manually operated by a user.

In FIG. 1, the first and second linear actuators 4, 6 are shown extended approximately halfway between their fully retracted and fully extended positions. A first level indicator 9, which is mounted to the front face of the front frame member 5, registers the side-to-side tilt of the bed platform 1 with respect to the horizontal plane of the earth. A second level indicator (shown in FIG. 5) registers the front-to-rear tilt of the bed platform with respect to the horizontal plane of the earth. The left end of a rear base support 10 is shown underneath the bed platform 1. In an alternate embodiment, electronic accelerometers (not shown) are used either in lieu of or in addition to the first and second level indicators 9, 30 so that the platform can be leveled automatically via a microcontroller. In the latter embodiment, one electronic accelerometer would be placed along the X-axis of the bed platform 1, and the other electronic accelerometer would be placed along the Y-axis of the bed platform 1.

Figure 2:
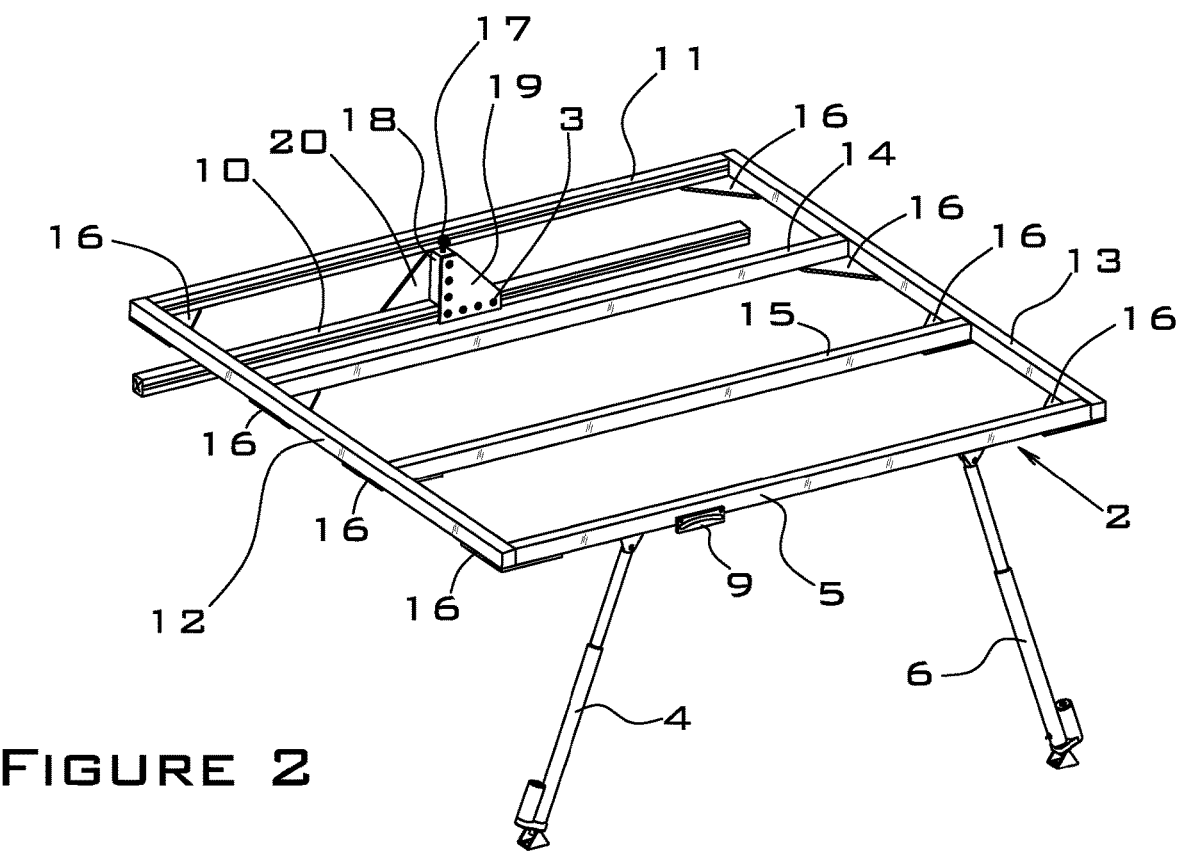
FIG. 2 is the same perspective view of the present invention shown in FIG. 1, with the bed platform removed.

FIG. 2 is the same perspective view of the present invention shown in FIG. 1, with the bed platform removed for clarity. The bed platform 1 (shown in FIG. 1) is supported by a front frame member 5, a rear frame member 11, a left frame member 12, a right frame member 13, a first internal frame member 14 and a second internal frame member 15, which together form the bed platform frame 2. The frame members 5, 11, 12 and 13 are connected so as to form a rectangular shape, in which the front frame member 5 and the rear frame member 11 are parallel to each other, and in which the left frame member 12 and the right frame member 13 are parallel to each other and perpendicular to the front frame member 5 and the rear frame member 11. The first internal frame member 14 and the second internal frame member 15 are installed within the rectangular perimeter of the frame 2, are oriented parallel to the front frame member 5, and positioned so that the spacing between the rear frame member 11 and the first internal frame member 14, the spacing between the first internal frame member 14 and the second internal frame member 15, and the spacing between the second internal frame member 15 and the front frame member 5 are all approximately equal.

The first purpose of the first and second internal frame members 14, 15 is to provide additional rigidity under the central portion of the bed platform 1 when the bed platform 1 is supporting the weight of a sleeping person. The second purpose of the first and second internal frame members 14, 15 is to provide attachment points for the rectangular channels of the optional table system described in reference to FIGS. 11-13. The frame members 5, 11, 12, 13, 14 and 15 are preferably manufactured from rigid rectangular channel sections. Triangular-shaped corner braces 16 are utilized to form right-angle connections between the left end of the rear frame member 11 and the rear end of the left frame member 12, the right end of the rear frame member 11 and the rear end of the right frame member 13, the left end of the front frame member 5 and the front end of the left frame member 12, and the right end of the front frame member 5 and the front end of the right frame member 13. Corner braces 16 are also utilized to perpendicularly connect the left and right ends, respectively, of the first internal frame member 14 to the left and right frame members 12, 13 at a distance approximately one-third the length from the rear frame member 11 to the front frame member 5, and to perpendicularly connect the left and right ends, respectively, of the second internal frame member 15 to the left and right frame members 12, 13 at a distance approximately two-thirds the length from the rear frame member 11 to the front frame member 5. The corner braces 16 are attached to their respective frame member pieces 5, 11, 12, 13, 14 and 15 via machine screws 3 (shown in FIG. 3).

The front edge of the center portion of the rear frame member 11 is connected to a heim joint 17 (a/k/a "rod end bearing" joint) via a bolt (shown in FIG. 4) that passes through the heim joint 17 and is threaded into the rear frame member 11. Note that the heim joint may be replaced with a ball joint. Note also that the heim (or ball) joint 17 may be connected to the rear frame member 11 anywhere along the rear frame member 11; in a preferred embodiment, the heim joint 17 is connected to the rear frame member 11 in the center of the rear frame member.

The lower (shaft) end of the heim joint 17 is threaded into the upper end of a vertically oriented heim joint support 18. The lower end of the heim joint support 18 is connected to the upper edge of the rear base support 10 by a front helm joint brace 19 and a rear helm joint brace 20, which are rigidly attached to the heim joint support 18 and the rear base support 10 with machine screws 3. The rear base support 10 is oriented parallel to the rear frame member 11 when the heim joint 17 is at a centered position (i.e., when the heim joint support 18 is oriented perpendicular to the rear frame member 11). The rear base support 10 is positioned below the front edge of the rear frame member 11, as shown most clearly in FIG. 3.

In a preferred configuration, the length of the rear base support 10 is approximately the same as the length of the rear frame member 11, but the length of the rear base support 10 may be optionally shortened or lengthened as required to optimally fit within specific vehicle dimensions. The rear base support 10 is preferably manufactured from a rigid rectangular channel section similar to the material from which the frame members 5, 11, 12, 13, 14 and 15 are manufactured. The spherical swivel mechanism of the heim joint 17 allows the bed platform frame 2 to tilt both side-to-side and front-to-back with respect to the orientation of the rear base support 10 when connected as described. Details of the heim joint assembly are discussed in greater detail with respect to FIGS. 3 and 4.

Figure 3:
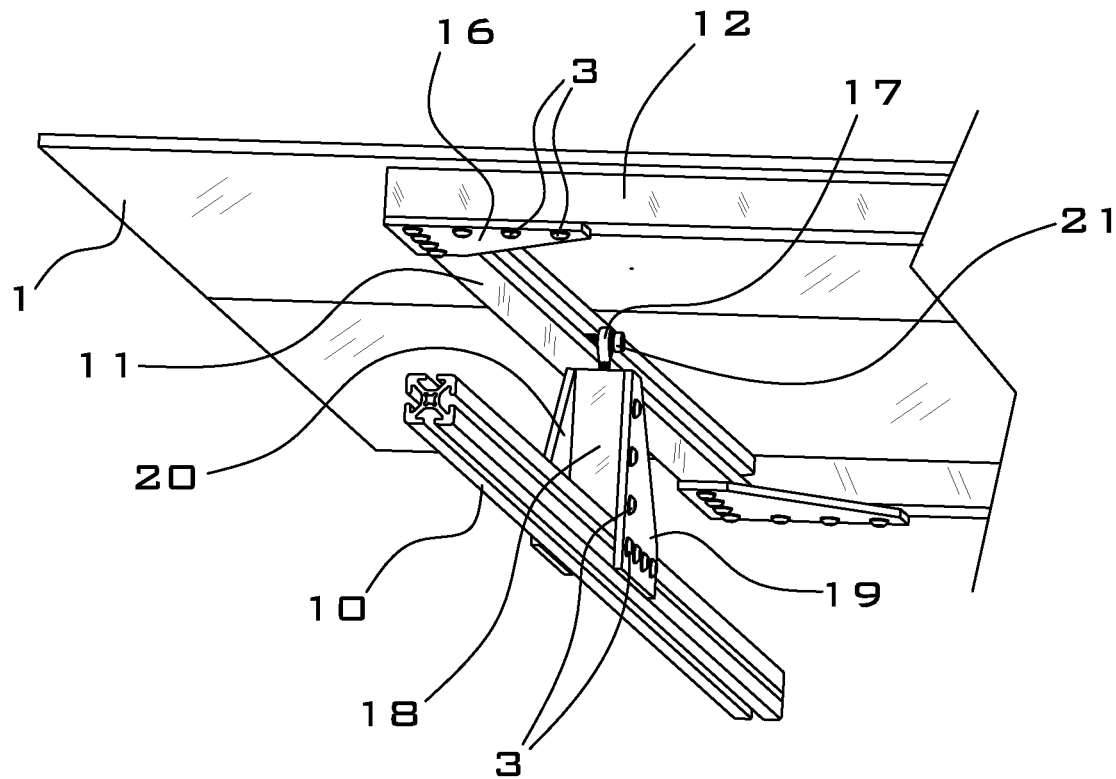
FIG. 3 is a detail perspective view of the underside of a rear portion of the present invention, showing the relative positions of the components of the heim joint assembly.
Figure 4:
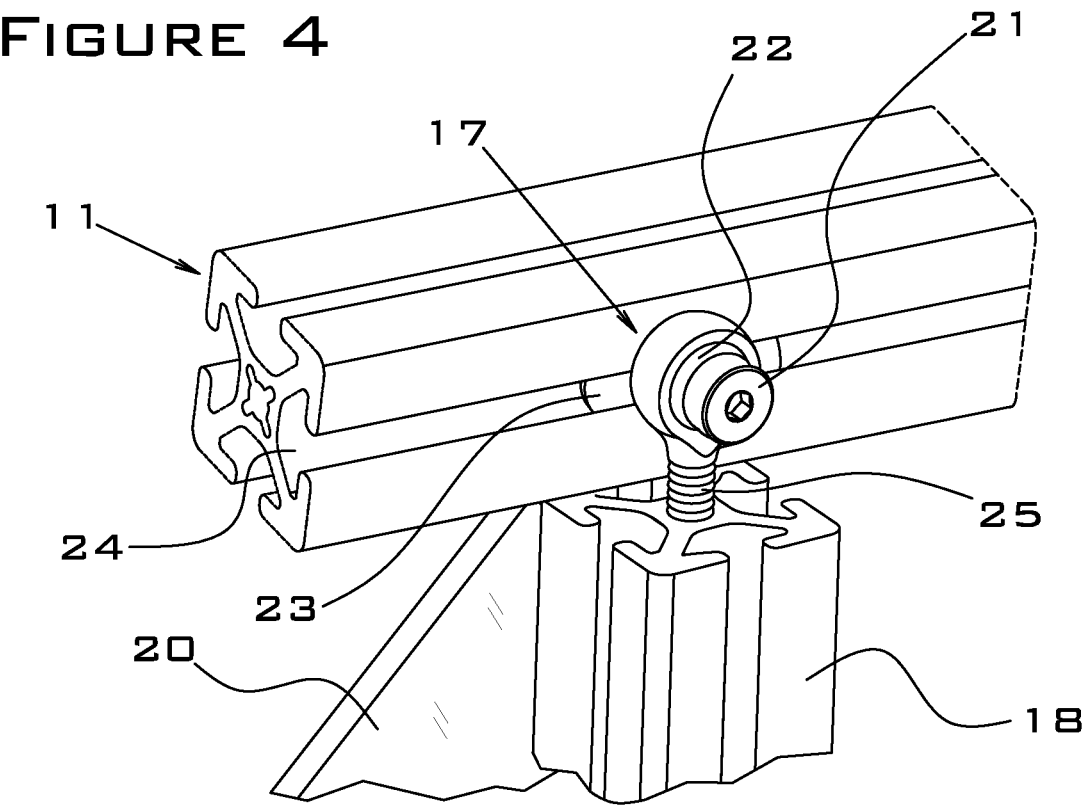
FIG. 4 is a magnified detail perspective view of the top and front side of the heim joint with the front heim joint brace removed for clarity.

FIG. 3 is a detail perspective view of the underside of a rear portion of the present invention, showing the relative positions of the components of the heim joint assembly. FIG. 4 is a magnified detail perspective view of the top and front side of the heim joint with the front heim joint brace removed for clarity. As shown in FIGS. 3 and 4, the rotatable portion of the heim joint 17 is connected to the rear frame member 11 via a bolt 21 that passes through the ball swivel 22 of the heim joint 17 and is threaded into a tee nut 23, which is positioned within a slot 24 in the rear frame member 11; the shank 25 of the heim joint 17 is threaded into the upper surface of the heim joint support 18.

Figure 5:
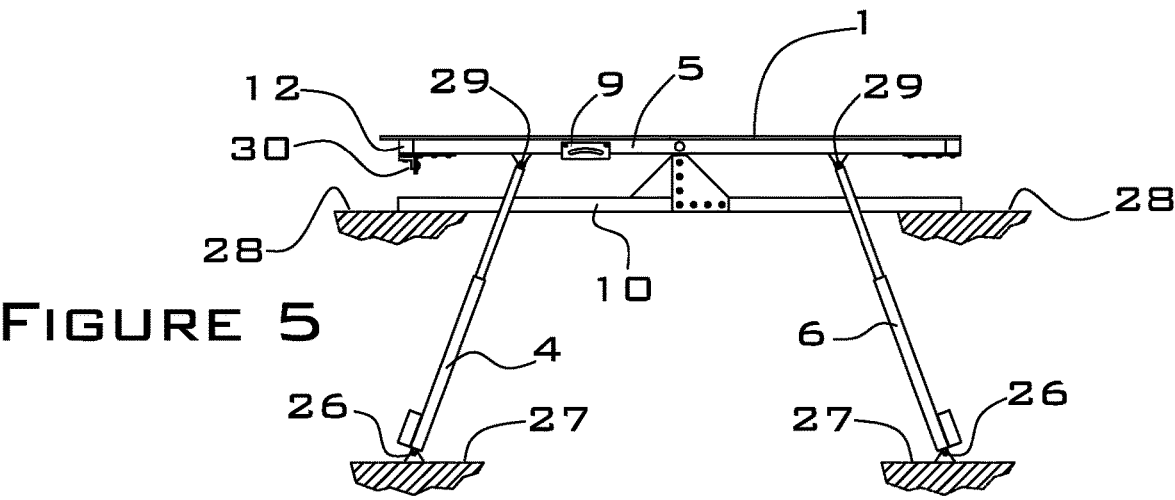
FIG. 5 is a front elevation view of the present invention with the bed platform in a horizontal position.
Figure 6:
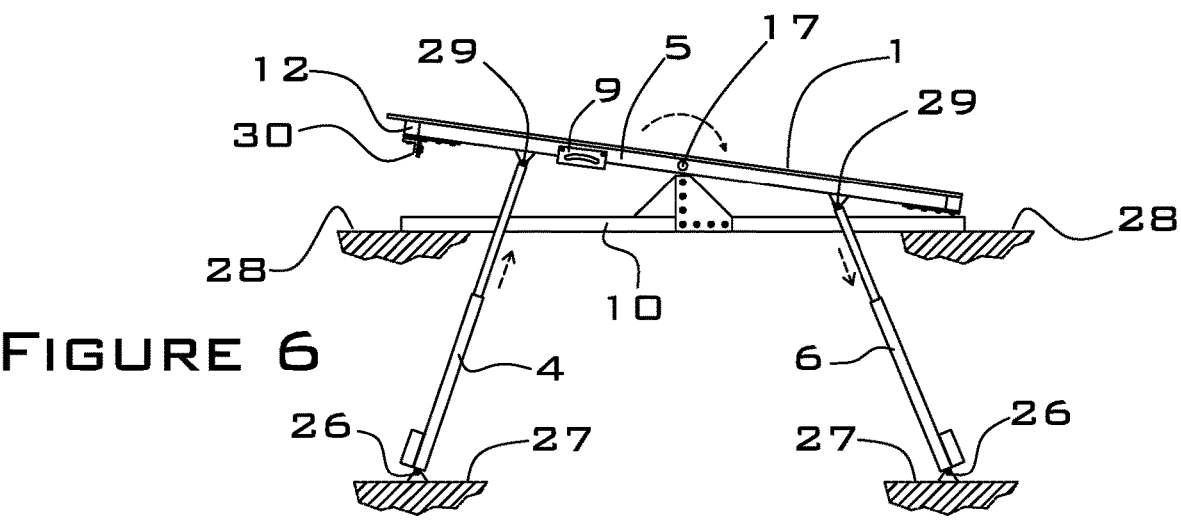
FIG. 6 is a front elevation view of the present invention with the bed platform tilted so that the left side is higher than the right side.
Figure 7:
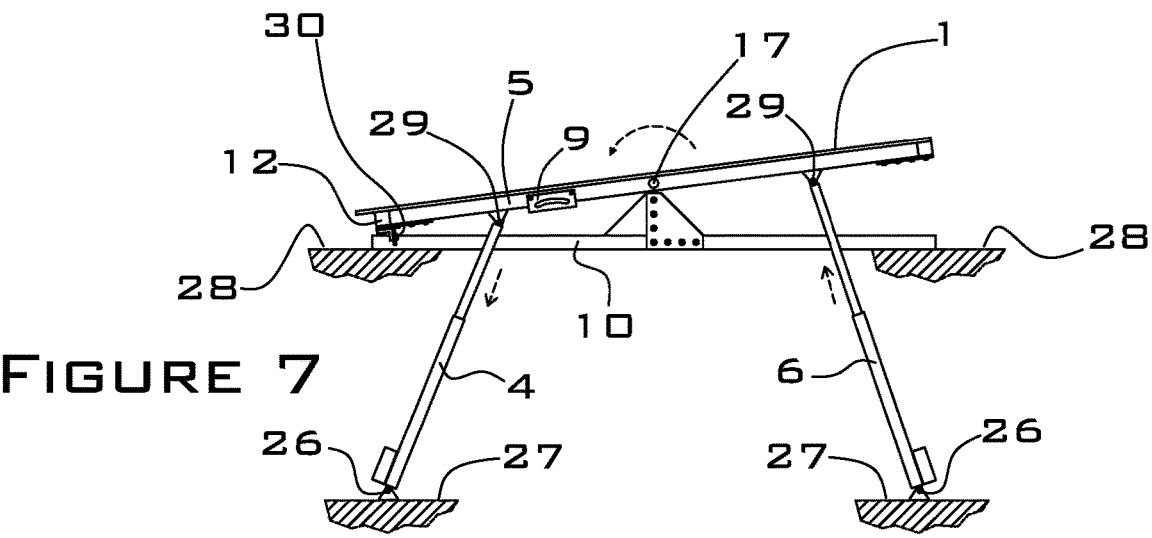
FIG. 7 is a front elevation view of the present invention with the bed platform tilted so that the left side is lower than the right side.

FIGS. 5, 6 and 7 are front elevation views of the present invention that illustrate the side-to-side tilting capability of the bed platform 1. In these figures, the lower ends of the first and second linear actuators 4, 6 are each rotatably connected via lower pin connections 26 to a first fixed surface 27 that is approximately parallel to the horizontal plane of the earth (for example, a van floor when the van is parked on level ground), and the two ends of the rear base support 10 are each fixedly connected to second fixed surface 28 that is also approximately parallel to the horizontal plane of the earth and at an elevation above the elevation of the first fixed surface 27 (for example, a storage cabinet top that is resting on the floor of a van that is parked on level ground). The upper ends of the first and second linear actuators are connected via upper pin connections 29 to the bottom edge of the front frame member 5. The first level indicator 9 (which measures side-to-side tilt) is shown mounted to the front frame member 5, and an identical second level indicator 30 is shown mounted to the bottom front edge of the left frame member 12 so that it measures front-to-rear tilt of the bed platform 1.

In FIG. 5, the first and second linear actuators 4, 6 are each shown set to a length corresponding to approximately one-half of their maximum extension, which causes the plane of the bed platform 1 to be parallel with the plane of the first fixed surface 27. In FIG. 6, the first linear actuator 4 has been extended to its maximum length, and the second linear actuator 6 has been retracted to its minimum length, as indicated by the straight dashed arrows, causing the bed platform 1 to rotate about the heim joint 17 in a clockwise direction, as indicated by the curved dashed arrow, thereby resulting in a tilt of the bed platform 1 in which the left side of the bed platform 1 is at an elevation higher than the right side. In FIG. 7, the first linear actuator 4 has been retracted to its minimum length, and the second linear actuator 6 has been extended to its maximum length, as indicated by the straight dashed arrows, causing the bed platform 1 to rotate about the heim joint 17 in a counterclockwise direction, thereby resulting in a tilt of the bed platform 1 in which the right side of the bed platform 1 is at an elevation higher than the left side.

In the descriptions of the tilting mechanism above related to FIGS. 5, 6 and 7, the first fixed surface 27 and the second fixed surface 28 are shown as being approximately parallel to the horizontal plane of the earth (and therefore approximately parallel to each other), in order to more clearly describe the tilt of the bed platform relative to the horizontal plane of the earth. It should be noted that it is not required for the first fixed surface 27 and the second fixed surface 28 to be parallel to each other or parallel to the horizontal plane of the earth when the present invention is mounted in a vehicle because the adjustment capability of the present invention provides for a bed platform that can be set parallel to the horizontal plane of the earth when the first fixed surface 27 and the second fixed surface 28 are not parallel to each other or to the horizontal plane of the earth.

FIGS. 8, 9 and 10 are left side elevation views of the present invention that illustrate the front-to-rear tilting capability of the bed platform. In these figures, the first and second linear actuators are maintained at identical lengths and are raised and lowered in unison. In FIG. 8, the first linear actuator 4 and second linear actuator 6 (shown in FIG. 5) are each set to a length corresponding to approximately one-half of their maximum extension, which causes the plane of the bed platform 1 to be parallel to the plane of the first fixed surface 27. In FIG. 9, the first linear actuator 4 and the second linear actuator 6 (shown in FIG. 5) are extended to their maximum lengths, as indicated by the straight dashed arrow, causing the bed platform to rotate in a counterclockwise direction about the heim joint 17, as indicated by the curved dashed arrows, thereby resulting in a tilt of the bed platform 1 in which the head end (the end adjacent to the linear actuators) of the bed platform 1 is at an elevation higher than the foot end (the end near the heim joint). In FIG. 10, the first linear actuator 4 and the second linear actuator 6 (shown in FIG. 5) are retracted to their minimum lengths, as shown by the straight dashed arrow, causing the bed platform to rotate in a clockwise direction about the heim joint 17, as shown by the curved dashed arrows, thereby resulting in a tilt of the bed platform 1 in which the head end of the bed platform 1 is at a lower elevation than the foot end.

By independently adjusting the extension lengths of the first linear actuator 4 and the second linear actuator 6, the bed platform 1 may be simultaneously adjusted for side-to-side tilt (as shown in FIGS. 5-7) and front-to-rear tilt (as shown in FIGS. 8-10). This capability for the bed platform 1 to be simultaneously adjustable for both side-to-side tilt and front-to-rear tilt enables a user to adjust the bed frame 1 so that it is set parallel to the horizontal plane of the earth when the present invention is mounted in a vehicle which is parked on a ground surface that slopes side-to-side as well as front-to-back. By observing the first and second level indicators 9, 30 while raising and lowering the first and second linear actuators 4, 6, a user can adjust the bed frame to be parallel with the horizontal plane of the earth regardless of the direction of the ground tilt on which the vehicle is parked.

Figure 11:
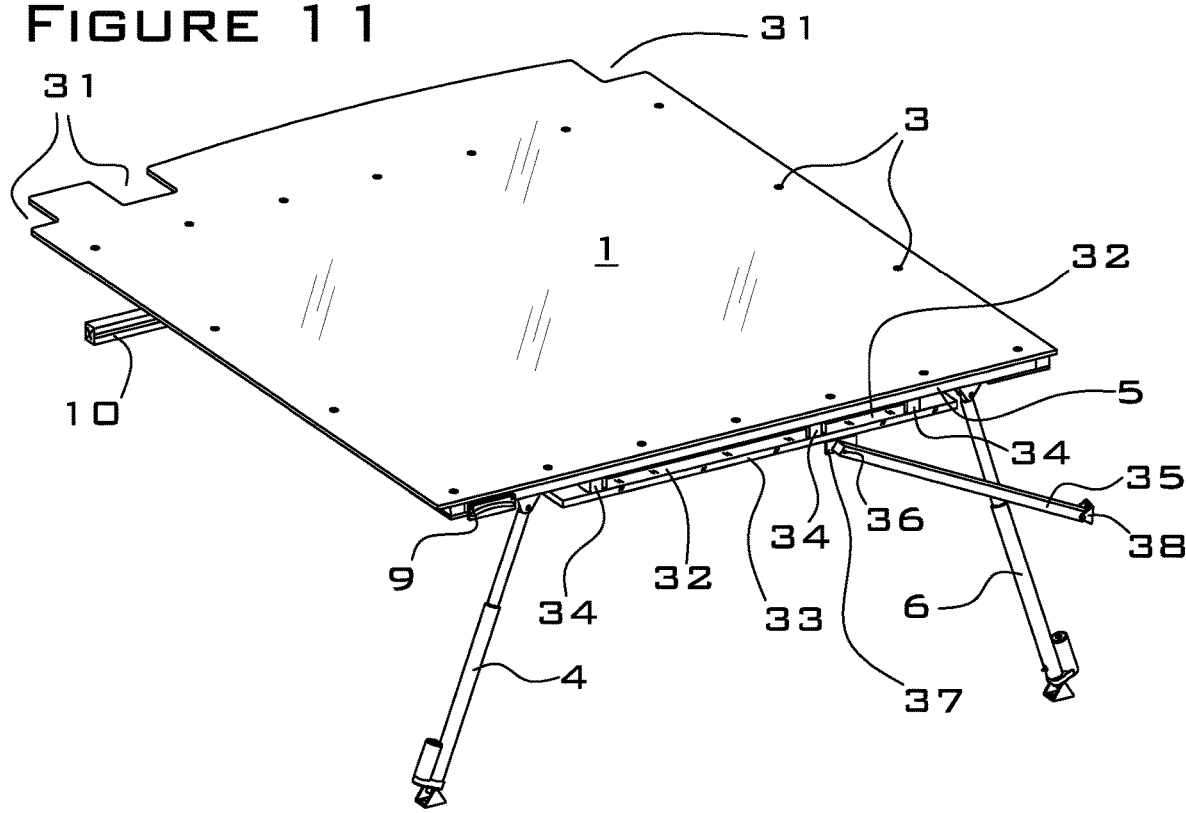
FIG. 11 is a perspective view of the present invention showing three optional features, with the optional table boards each shown in a retracted position.

FIG. 11 is a perspective view of the present invention showing three optional features. The first optional feature shown is a customized shape of the bed platform 1 with cutouts 31 that enable the present invention to fit within the interior of a specific vehicle that contains objects such as cabinets or wheel wells that would interfere with the fit of a standard rectangular-shaped bed platform.

The second optional feature shown in FIG. 11 are two table boards 32 that are slidably mounted underneath the bed platform 1 and are supported on their bottom surfaces by a table support panel 33, which is fixedly attached to the underside of the bed platform 1 by three rectangular channels 34. In FIG. 11, the table boards 32 are shown in a retracted or stowed position.

The third optional feature shown in FIG. 11 is a stabilizer arm 35 (a/k/a "Panhard rod"), which has an upper end rotatably attached via a first pin connection 36 to an angle bracket 37 that is bolted to the underside of the table support panel 33, and which has a lower end that is rotatably attached via a second pin connection 38 to any suitably sturdy vertical surface within the vehicle such as an interior wall or cabinet (not shown). Note that the first and second pin connections 36, 38 each comprises at least one hole through which the pin connection may be bolted or otherwise attached to a surface. The purpose of the stabilizer arm 35 is to provide additional lateral stability to the bed platform 1, thereby allowing for more comfortable sleep. Because the stabilizer arm 35 has rotatable connections at each end, it can remain attached at both ends when the first and second linear actuators 4, 6 are being adjusted. For versions of the present invention that do not include table boards, the angle bracket 37 may be mounted directly to the underside of the front frame member 5.

Figure 12:
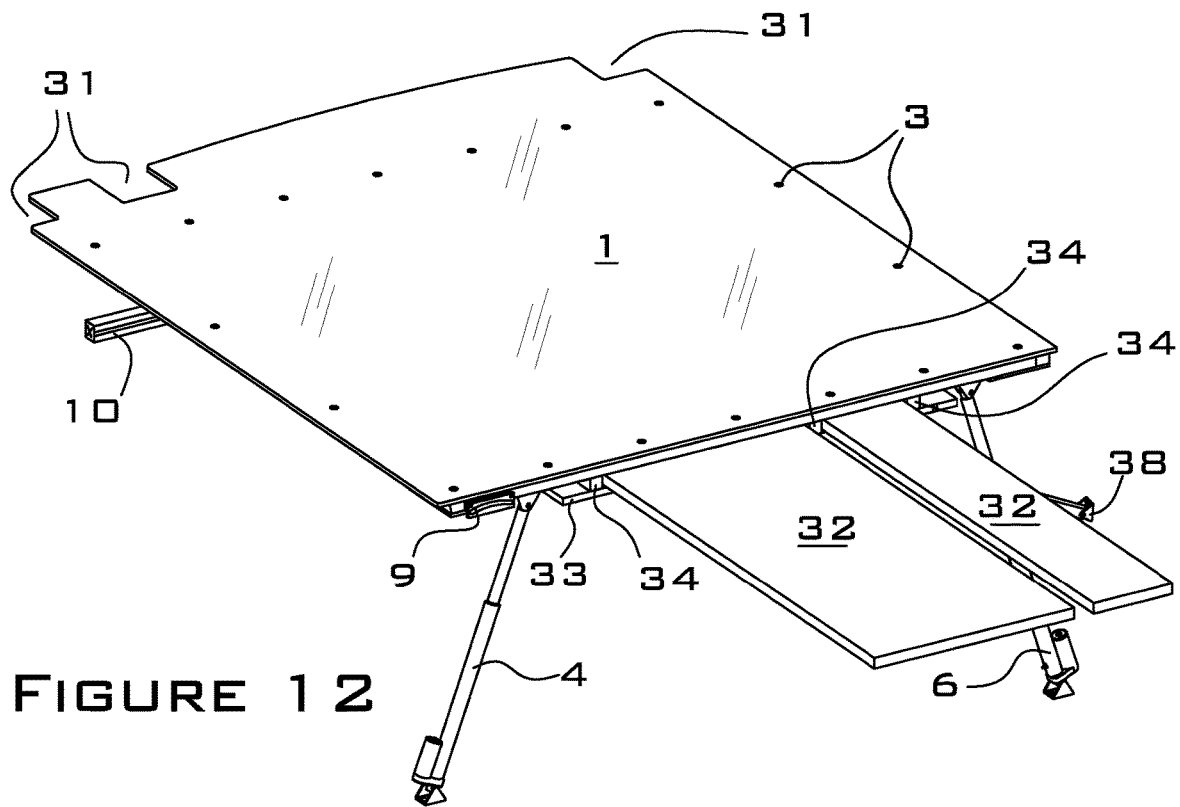
FIG. 12 is a perspective view of the present invention showing three optional features, with the optional table boards each shown in an extended position.

FIG. 12 is the same perspective view of the present invention as shown in FIG. 11, but with the table boards 32 each shown in an extended or deployed position. The plane of the coplanar table boards 32 is parallel to the plane of the bed platform 1; therefore, when the bed platform 1 is adjusted so as to be parallel with the horizontal plane of the earth, items such as food and beverages will not tend to slide or roll off the table boards 32.

Figure 13:
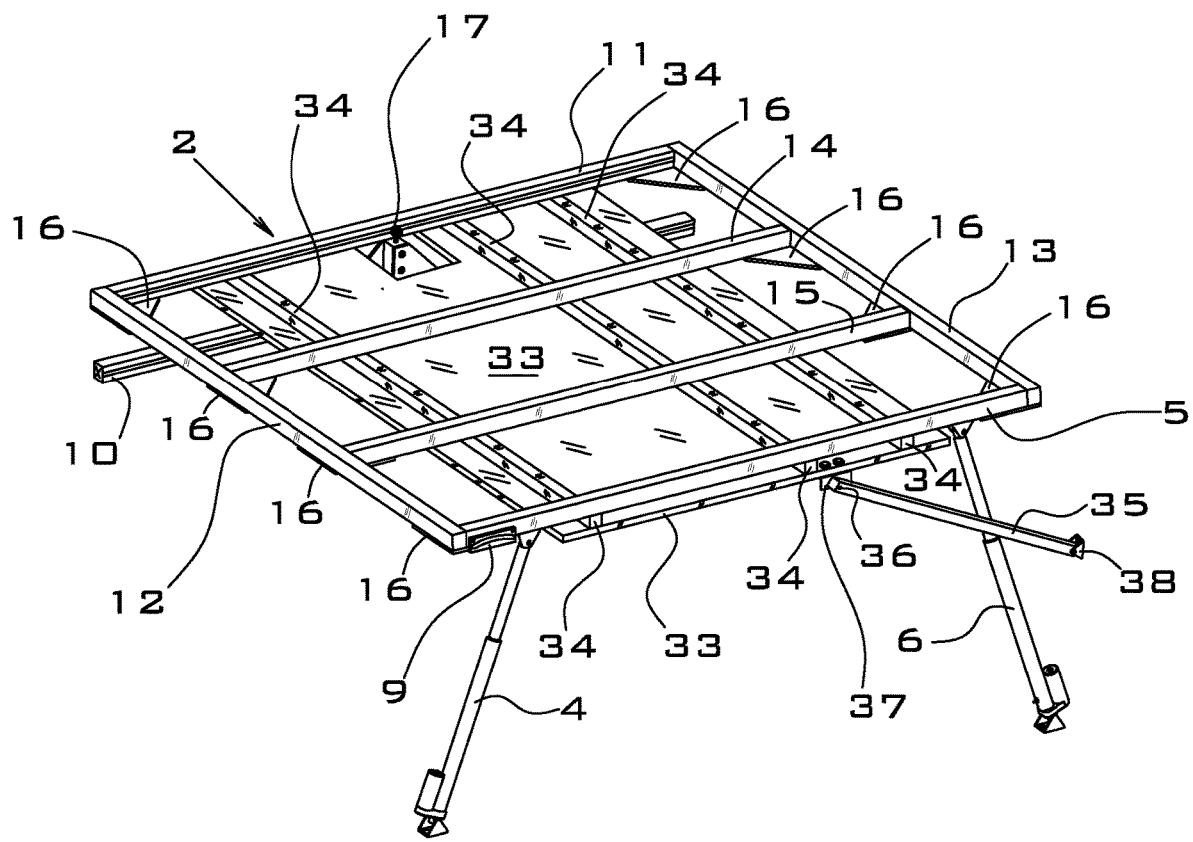
FIG. 13 is the same perspective view of the present invention as shown in FIG. 11 with the bed platform and the table boards removed in order to show the table support panel.

FIG. 13 is the same perspective view of the present invention as shown in FIG. 11 with the bed platform and the table boards removed in order to show the table support panel 33. The upper surface of the table support panel 33 is rigidly attached to three rectangular channels 34, which are bolted to the underside of the frame 2.

Figure 14:
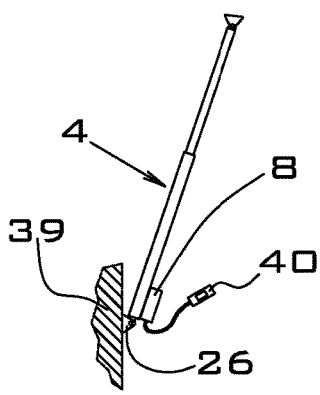
FIG. 14 is a front elevation view of the first linear actuator shown in an optional mounting position, in which the lower pin connection is mounted to a vertical surface.

FIG. 14 is a front elevation view of the first linear actuator 4 shown in an optional mounting position, in which the lower pin connection 26 is mounted to a vertical surface 39 instead of a horizontal surface. The second linear actuator 6 (shown in FIG. 5) may also be mounted to a vertical surface in a similar manner. Also shown is a momentary contact switch 40, which is used to manually turn on and off the motor 8 of the first linear actuator 4. The second linear actuator 6 comprises a similar momentary contact switch (not shown).

Examples of materials that are suitable for construction of the present invention are described as follows. Plywood may be used for the bed platform, the table boards and the table support panel. Extruded anodized aluminum T-slot channel, part number 1515-S, manufactured by 80/20 Inc. (www.8020.net), may be used for the frame members, the rear base support and the heim joint support. Extruded anodized aluminum T-slot channel, part number 25-2503, manufactured by 80/20 Inc. (www.8020.net), may be used for the rectangular channels. Anodized aluminum diagonal corner braces, part number 4352, manufactured by 80/20 Inc. may be used for the corner braces and the heim joint braces. WindyNation 20-inch stroke linear actuators, part number ACT-20in-MBRKS-SWITCH-N, available from Amazon.com may be used for the linear actuators. Hopkins level indicators, part number 8526, manufactured by Hopkins Inc. and available through Amazon.com may be used for the level indicators. Ball joint part number 60645K13, available from McMasterCarr.com may be used for the heim joint.

The present invention may be constructed with the following variations from the previous descriptions. The frame members may be connected by welded joints instead of machine screws. Heim joints rather than pin connections may be utilized for the upper and lower connections of the linear actuators. The leveling system may incorporate automatic leveling sensor components to replace the manual leveling switches. Jacks (including, but not limited to, screw-type jacks) or levers, or mechanical, pneumatic or hydraulic linear actuators may replace the electric linear actuators. The first internal frame member and the second internal frame member may optionally be oriented parallel to the left frame member and the right frame member, rather than being oriented parallel to the front frame member and rear frame member. The first internal frame member and the second internal frame member may be replaced with a single internal frame member that is positioned parallel to the front frame member and located halfway between the front frame member and the rear frame member. The bed platform may be replaced with a work table, shower, sink, cooktop, oven, or other appliance that would benefit from having a level surface when a vehicle is parked on unlevel ground.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A platform leveling apparatus comprising: (a) a platform attached to a frame, the frame comprising a front frame member and a rear frame member; (b) two and only two linear actuators, the two and only two linear actuators comprising:(i) a first linear actuator having an upper end that is rotatably attached to a first side of the front frame member; and (ii) a second linear actuator having an upper end that is rotatably attached to a second and opposite side of the front frame member; (c) one and only one heim joint configured to form a pivot support; (d) a table support panel that is fixedly attached to an underside of the platform so that the table support panel is parallel to the underside of the platform:(e) at least one table board that is slidably mounted between the table support panel and the underside of the platform: and (f) a stabilizer arm having an upper end that is rotatably attached to an angle bracket, the angle bracket being attached to an underside of the table support panel, and a stabilizer arm lower end that is configured to be rotatably attached to a vertical surface within a vehicle; wherein the rear frame member is connected to the one and only one heim joint; wherein the heim joint comprises a lower end that is connected to an upper end of a heim joint support; wherein a lower end of the heim joint support is connected to a rear base support by at least one of a front heim joint brace or a rear heim joint brace; wherein the rear base support is oriented parallel to the rear frame member when the heim joint is at a centered position; wherein the rear base support is positioned below a front edge of the rear frame member; wherein each of the first and second linear actuators has a lower end that is configured to be rotatably connected to a first fixed surface; wherein each of the first and second linear actuators comprises a piston that is configured to be extended and retracted by an electric motor; and wherein the platform is configured to tilt both side-to-side and front-to-rear on the one and only one heim joint.

2. The platform leveling apparatus of claim 1, wherein the frame further comprises a left frame member, a right frame member, and at least one internal frame member;
wherein the front frame member, the rear frame member, the left frame member and the right frame member are configured to form a perimeter of a rectangle; and
wherein the at least one internal frame member extends from one side of the perimeter of the rectangle to an opposing side of the rectangle.

3. The platform leveling apparatus of claim 1, wherein the rear base support comprises a first end and a second end, each of which is configured to be attached to a second fixed surface.

4. The platform leveling apparatus of claim 1, further comprising:
(a) a first level indicator that is mounted to a front face of the front frame member and configured to measure side-to-side tilt of the platform; and
(b) a second level indicator that is mounted to the frame and configured to measure front-to-rear tilt of the platform.

5. The platform leveling apparatus of claim 4, wherein the second level indicator is mounted to a bottom front edge of the left frame member or the right frame member.

6. The platform leveling apparatus of claim 1, wherein the frame is situated entirely underneath the platform.

7. The platform leveling apparatus of claim 1, wherein the platform is flat and rectangular in shape.

8. The platform leveling apparatus of claim 7, wherein the platform comprises cutouts that are configured to enable the platform to fit within an interior of the vehicle.

9. The platform leveling apparatus of claim 1, wherein when the vehicle is parked on a ground and the platform is situated on or in the vehicle the first fixed surface is configured to be parallel to the ground.

10. The platform leveling apparatus of claim 1, further comprising: (a) a first electronic accelerometer that is situated on an X-axis of the platform; and (b) a second electronic accelerometer that is situated on a Y-axis of the platform.

11. The platform leveling apparatus of claim 1, wherein the one and only one heim joint is connected to a center portion of the rear frame member.

12. A platform leveling apparatus comprising: (a) a platform attached to a frame, the frame comprising a front frame member and a rear frame member; (b) two and only two linear actuators, the two and only two linear actuators comprising:(i) a first linear actuator having an upper end that is rotatably attached to a first side of the front frame member; and (ii) a second linear actuator having an upper end that is rotatably attached to a second and opposite side of the front frame member; (c) one and only one ball joint configured to form a pivot support; (d) a table support panel that is fixedly attached to an underside of the platform so that the table support panel is parallel to the underside of the platform:(e) at least one table board that is slidably mounted between the table support panel and the underside of the platform; and (f) a stabilizer arm having an upper end that is rotatably attached to an angle bracket, the angle bracket being attached to an underside of the table support panel, and a stabilizer arm lower end that is configured to be rotatably attached to a vertical surface within a vehicle; wherein the rear frame member is connected to the one and only one ball joint; wherein the ball joint comprises a lower end that is connected to an upper end of a ball joint support; wherein a lower end of the ball joint support is connected to a rear base support by at least one of a front ball joint brace or a rear ball joint brace; wherein the rear base support is oriented parallel to the rear frame member when the ball joint is at a centered position; wherein the rear base support is positioned below a front edge of the rear frame member; wherein each of the first and second linear actuators has a lower end that is configured to be rotatably connected to a first fixed surface; wherein each of the first and second linear actuators comprises a piston that is configured to be extended and retracted by an electric motor; and wherein the platform is configured to tilt both side-to-side and front-to-rear on the one and only one ball joint.

13. A platform leveling apparatus comprising: (a) a platform attached to a frame, the frame comprising a front frame member and a rear frame member; (b) two and only two manual screw jacks, the two and only two manual screw jacks comprising:(i) a first manual screw jack having an upper end that is rotatably attached to a first side of the front frame member; and (ii) a second manual screw jack having an upper end that is rotatably attached to a second and opposite side of the front frame member; (c) one and only one heim joint configured to form a pivot support; (d) a table support panel that is fixedly attached to an underside of the platform so that the table support panel is parallel to the underside of the platform: and (e) at least one table board that is slidably mounted between the table support panel and the underside of the platform: and (f) a stabilizer arm having an upper end that is rotatably attached to an angle bracket, the angle bracket being attached to an underside of the table support panel, and a stabilizer arm lower end that is configured to be rotatably attached to a vertical surface within a vehicle; wherein the rear frame member is connected to the one and only one heim joint; wherein the heim joint comprises a lower end that is connected to an upper end of a heim joint support; wherein a lower end of the heim joint support is connected to a rear base support by at least one of a front heim joint brace or a rear heim joint brace; wherein the rear base support is oriented parallel to the rear frame member when the heim joint is at a centered position; wherein the rear base support is positioned below a front edge of the rear frame member; wherein each of the first and second manual screw jacks has a lower end that is configured to be rotatably connected to a first fixed surface; and wherein the platform is configured to tilt both side-to-side and front-to-rear on the one and only one heim joint.

14. A platform leveling apparatus comprising:(a) a platform attached to a frame, the frame comprising a front frame member and a rear frame member; (b) two and only two manual screw jacks, the two and only two manual screw jacks comprising:(i) a first manual screw jack having an upper end that is rotatably attached to a first side of the front frame member; and (ii) a second manual screw jack having an upper end that is rotatably attached to a second and opposite side of the front frame member; and (c) one and only one ball joint configured to form a pivot support; (d) a table support panel that is fixedly attached to an underside of the platform so that the table support panel is parallel to the underside of the platform: and (e) at least one table board that is slidably mounted between the table support panel and the underside of the platform: and (f) a stabilizer arm having an upper end that is rotatably attached to an angle bracket, the angle bracket being attached to an underside of the table support panel, and stabilizer arm a lower end that is configured to be rotatably attached to a vertical surface within a vehicle; wherein the rear frame member is connected to the one and only one ball joint; wherein the ball joint comprises a lower end that is connected to an upper end of a ball joint support; wherein a lower end of the ball joint support is connected to a rear base support by at least one of a front ball joint brace or a rear ball joint brace; wherein the rear base support is oriented parallel to the rear frame member when the ball joint is at a centered position; wherein the rear base support is positioned below a front edge of the rear frame member; wherein each of the first and second manual screw jacks has a lower end that is configured to be rotatably connected to a first fixed surface; and wherein the platform is configured to tilt both side-to-side and front-to-rear on the one and only one ball joint.

\* \* \* \* \*